(12) United States Patent
Norris et al.

(10) Patent No.: US 9,357,880 B2
(45) Date of Patent: Jun. 7, 2016

(54) OUTDOOR BARBEQUE GRILL AND OVEN

(71) Applicant: BNR Technology Development, LLC, Conroe, TX (US)

(72) Inventors: John W. Norris, Montgomery, TX (US); Jeffrey B. Norris, Montgomery, TX (US)

(73) Assignee: BNR Technology Development, LLC, Conroe, TX (US)

( * ) Notice: Subject to any disclaimer, the term of this patent is extended or adjusted under 35 U.S.C. 154(b) by 343 days.

(21) Appl. No.: 13/938,348

(22) Filed: Jul. 10, 2013

(65) Prior Publication Data

US 2015/0013662 A1 Jan. 15, 2015

(51) Int. Cl.
F24B 3/00 (2006.01)
A47J 37/07 (2006.01)

(52) U.S. Cl.
CPC .................................. A47J 37/0713 (2013.01)

(58) Field of Classification Search
CPC ............... F24C 5/04; F24C 5/18; F24C 5/00; F24C 5/20; A47J 37/07; A47J 37/0704; A47J 37/0713; A47J 37/00
USPC ............................. 126/25 R, 29, 30, 275, 276
See application file for complete search history.

(56) References Cited

U.S. PATENT DOCUMENTS

| | | | | |
|---|---|---|---|---|
| 760,430 A * | 5/1904 | Daniel | | 99/389 |
| 1,125,075 A * | 1/1915 | Detwiler | | 126/39 R |
| 2,691,369 A * | 10/1954 | Rutenber | | 126/332 |
| 2,806,463 A * | 9/1957 | Smith | | 126/25 A |
| 3,978,782 A * | 9/1976 | Werling | | 99/446 |
| 4,002,113 A * | 1/1977 | McLane | | 99/447 |
| 4,454,805 A * | 6/1984 | Matthews | | 99/400 |
| 4,662,349 A * | 5/1987 | McKenzie et al. | | 126/41 R |
| 4,724,823 A * | 2/1988 | Simpson | | 126/39 R |
| 4,850,333 A * | 7/1989 | Dellrud et al. | | 126/25 A |
| 5,163,359 A * | 11/1992 | McLane, Sr. | | 99/447 |
| 5,197,379 A * | 3/1993 | Leonard, Jr. | | 99/446 |
| 5,213,027 A | 5/1993 | Tsotsos et al. | | |
| 5,529,798 A | 6/1996 | Clark et al. | | |
| 5,649,477 A * | 7/1997 | Lingwood | | 99/446 |
| 5,891,498 A | 4/1999 | Boehler | | |
| 5,918,536 A * | 7/1999 | Cheng | | 99/447 |
| 7,638,738 B1 * | 12/2009 | Babington | | 219/450.1 |
| 8,381,712 B1 | 2/2013 | Simms, II | | |
| 8,919,336 B2 * | 12/2014 | von Herrmann et al. | | 126/39 J |
| 2004/0000303 A1 | 1/2004 | Regen et al. | | |
| 2006/0016348 A1 * | 1/2006 | Babington | | 99/422 |

(Continued)

FOREIGN PATENT DOCUMENTS

DE 4208575 A1 * 12/1992 .......... A47J 37/0704

OTHER PUBLICATIONS

Patent Cooperation Treaty; International Search Report and Written Opinion, Date of mailing: Nov. 3, 2014; pp. 1-10.

*Primary Examiner* — Kenneth Rinehart
*Assistant Examiner* — Jason Lau
(74) *Attorney, Agent, or Firm* — Tumey L.L.P.

(57) ABSTRACT

An Outdoor Barbeque Grill includes a housing within which is located an oven. The oven may include louvers for admitting heated gases into the oven and an adjustable outlet vent. In one embodiment the grill may include plural cooking surfaces with individual hoods for isolating cooking areas. One or more gas burners are positioned horizontally offset from the cooking area so that drippings from the food do no directly impinge on the burner thus avoiding flare-ups.

13 Claims, 5 Drawing Sheets

(56) References Cited

U.S. PATENT DOCUMENTS

| | | | |
|---|---|---|---|
| 2006/0027229 A1* | 2/2006 | Bass | 126/25 R |
| 2006/0180137 A1* | 8/2006 | McDonald | 126/25 R |
| 2006/0266345 A1* | 11/2006 | Chung | 126/25 R |
| 2009/0126714 A1* | 5/2009 | Barkhouse et al. | 126/39 G |
| 2009/0139511 A1* | 6/2009 | Dalrymple | 126/25 R |
| 2009/0145421 A1* | 6/2009 | Yufer | 126/25 R |
| 2010/0218691 A1* | 9/2010 | Adams et al. | 99/482 |
| 2010/0242943 A1* | 9/2010 | Laporta et al. | 126/25 B |
| 2011/0120442 A1 | 5/2011 | Duncan | |
| 2011/0219957 A1* | 9/2011 | Fogolin | 99/450 |
| 2012/0060819 A1* | 3/2012 | Hunt et al. | 126/1 R |

* cited by examiner

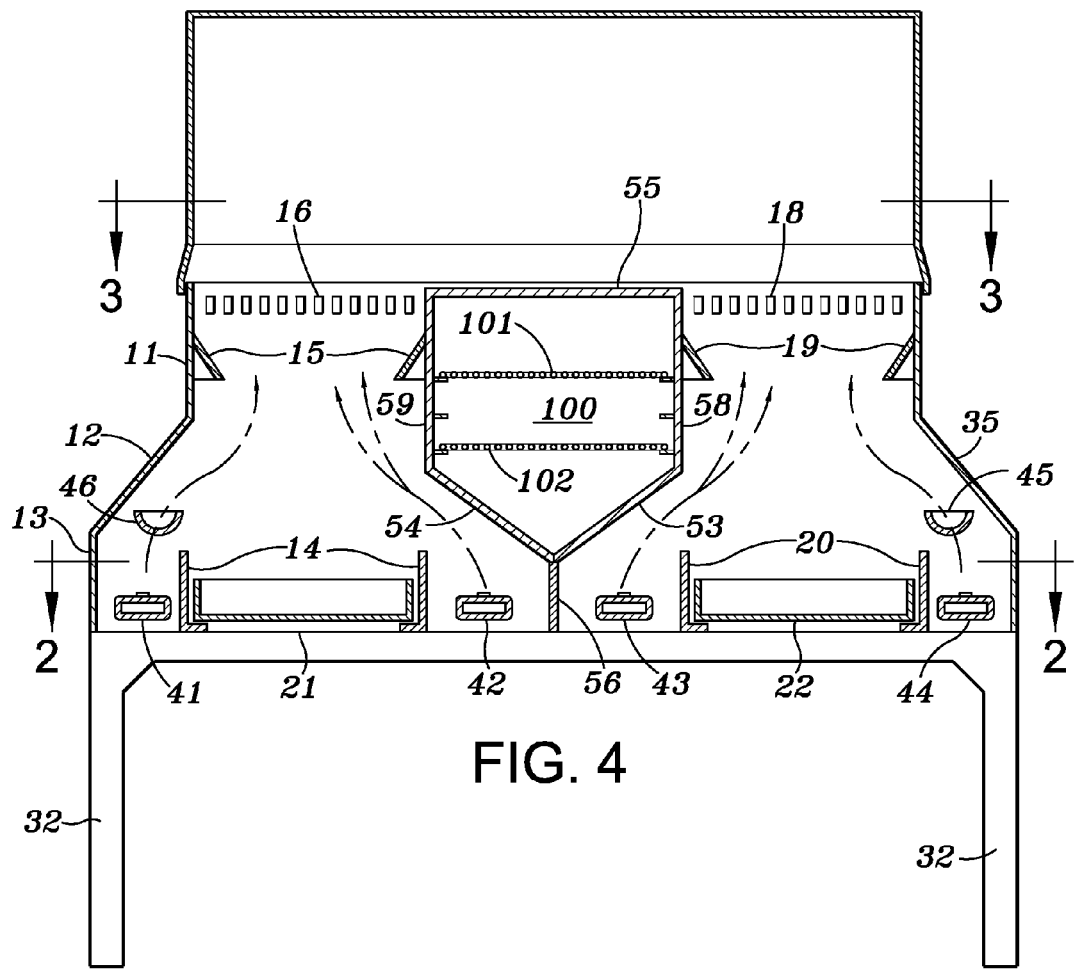
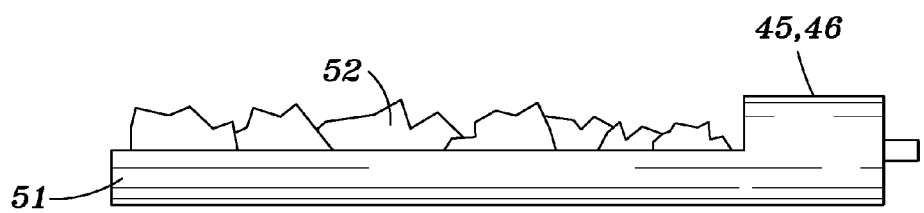

OUTDOOR BARBEQUE GRILL AND OVEN

BACKGROUND OF INVENTION

1. Field of the Invention

This invention relates to an outdoor barbeque grill (OBG) that includes a cooking surface, one or more burners and a source of fuel which can be, for example, either a portable container of propane or a conduit connected to a source of fuel utilized in a home or business. An oven is located within the grill housing.

2. Description of Related Art

Drippings from food being cooked on an outdoor grill can create problems. First the drippings can clog the burner outlets so as to interfere with proper combustion. Secondly, the drippings can cause flare ups by coming into contact with the burners. Flare ups can burn the food being barbequed and may have adverse health consequences.

One prior solution is to install covers over the burners to stop the drippings from direct contact with the burners; however the covers themselves can become hot enough to cause the drippings to ignite. Another approach is to use infrared heating. In this approach a surface is heated to the point of emitting infrared radiation which cooks the food. Yet another approach is to use a perforated plate between the cooking surface and the burner. These approaches are still subject to flare ups and utilize more energy because the intermediate surface needs to be heated.

Yet another approach has been tried involving indirect heat wherein the burners are not located directly below the cooking surface. Heated air and combustion gas are directed to the cooking surface. Consequently drippings do not fall on the burners. However, these indirect heating designs have not achieved commercial acceptance due to design failure. For example, an indirect heating unit is disclosed in U.S. Pat. No. 5,163,359.

However, the dripping collection area 100 is awkward to clean and requires some sort of a drain mechanism as shown in FIG. 5. Additionally cold air is drawn in through passages 70 which may create cool spots on the cooking surface and reduces the heating efficiency of the unit.

BRIEF SUMMARY OF THE INVENTION

The invention as claimed herein is to an OBG of the indirect heating type which includes a convenient arrangement for collecting and removing drippings from the food. According to another aspect of the invention, an oven is provided in addition to the traditional grilling surface whereby a variety of food items such as breads and vegetables may be cooked or heated. According to another aspect of the invention, a container for flavoring materials such as wood chips may be positioned within the heated gas flow to enhance the flavor of the cooked food.

BRIEF DESCRIPTION OF THE SEVERAL VIEWS OF THE DRAWING(S)

FIG. 4 is a vertical cross-sectional view of the embodiment shown in FIG. 1

FIG. 5 is a side view of a tray holder for food flavoring.

DETAILED DESCRIPTION OF THE INVENTION

Figure 1:
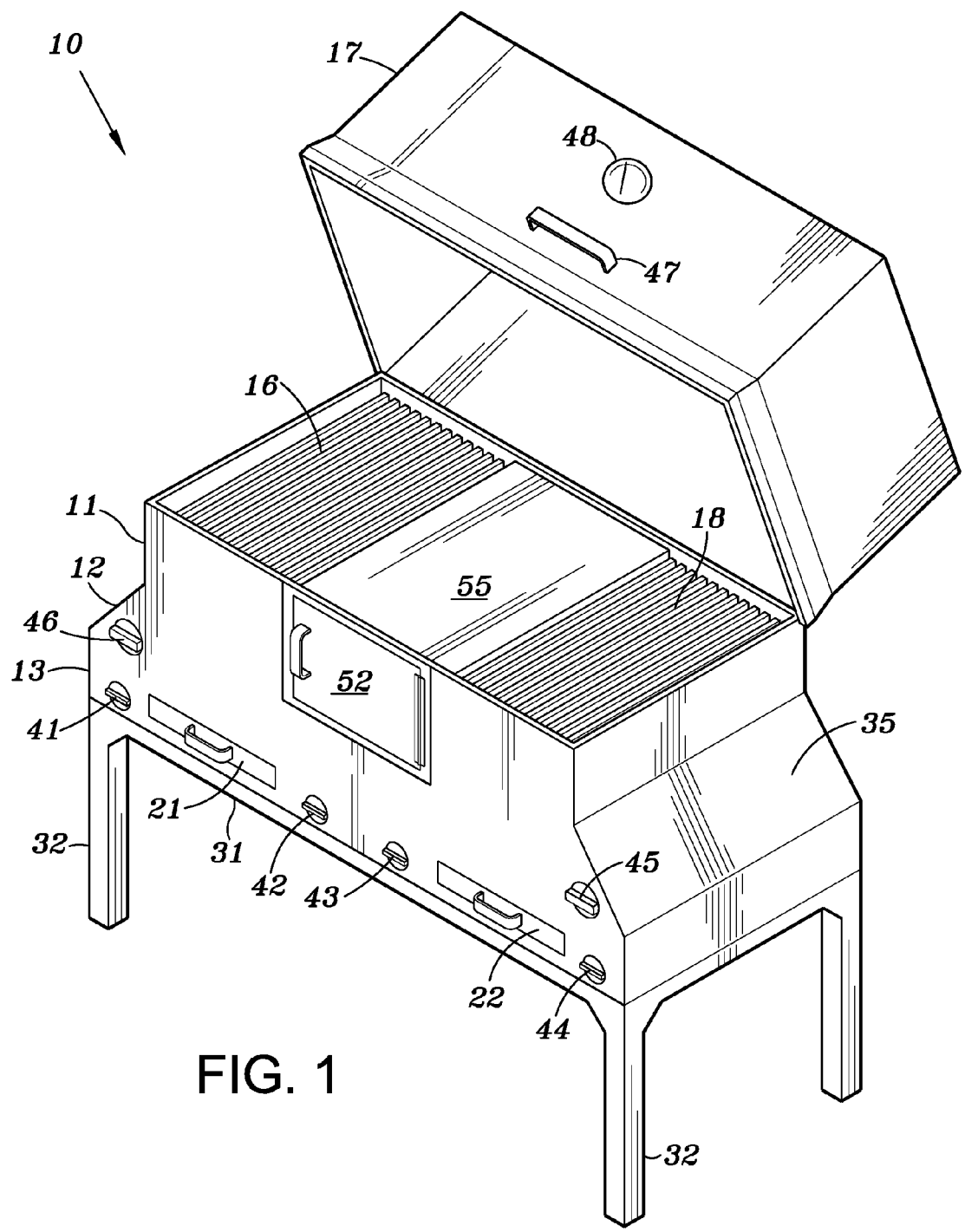
FIG. 1 is a perspective view of an OBG and oven according to an embodiment of the invention.

As shown in FIG. 1, an embodiment of the invention disclosed herein includes a support frame 31 having four legs 32 for supporting the OBG and oven 100 on a horizontal surface. The outdoor grill includes a pivoted cover 17, temperature gauge 48 and a handle 47 attached to cover 17. Grill 10 includes cooking surfaces 16 and 18 which may be of the type that included a plurality of spaced apart rods or bars that allow heated gases to pass between the bars or rods that support the food to be cooked. The top surface 55 of an oven is positioned between cooking surfaces 16 and 18. The oven includes a vertically pivoted oven door 52.

Figure 2:
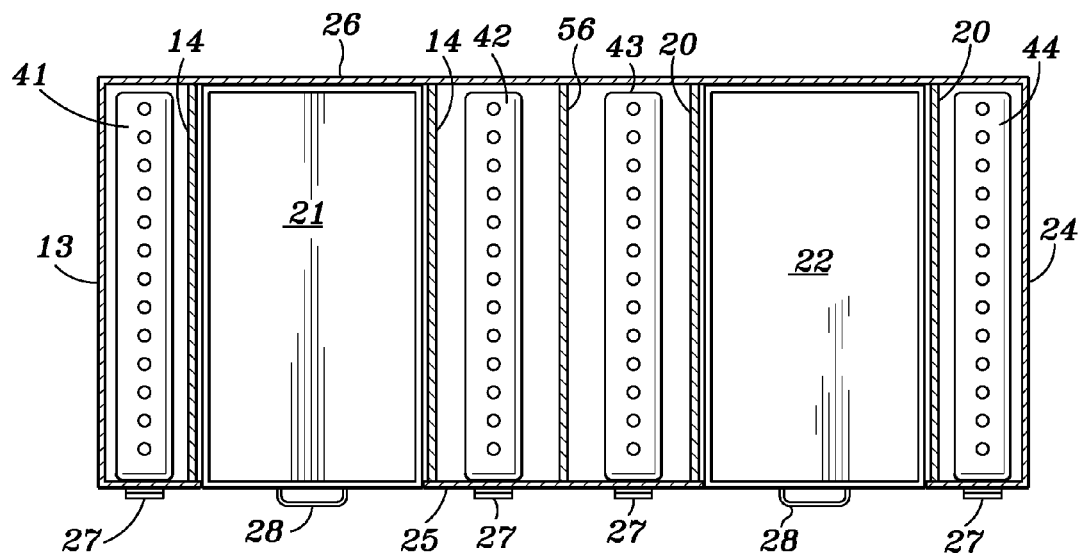
FIG. 2 is a cross-sectional view taken along line 2-2 of FIG. 4.

As shown in FIG. 2, the grill may include four burners 41, 42, 43 and 44 having control knobs 27. The burners may be circular or rectangular in shape or may comprise any type of burner that is known in the art.

Figure 3:
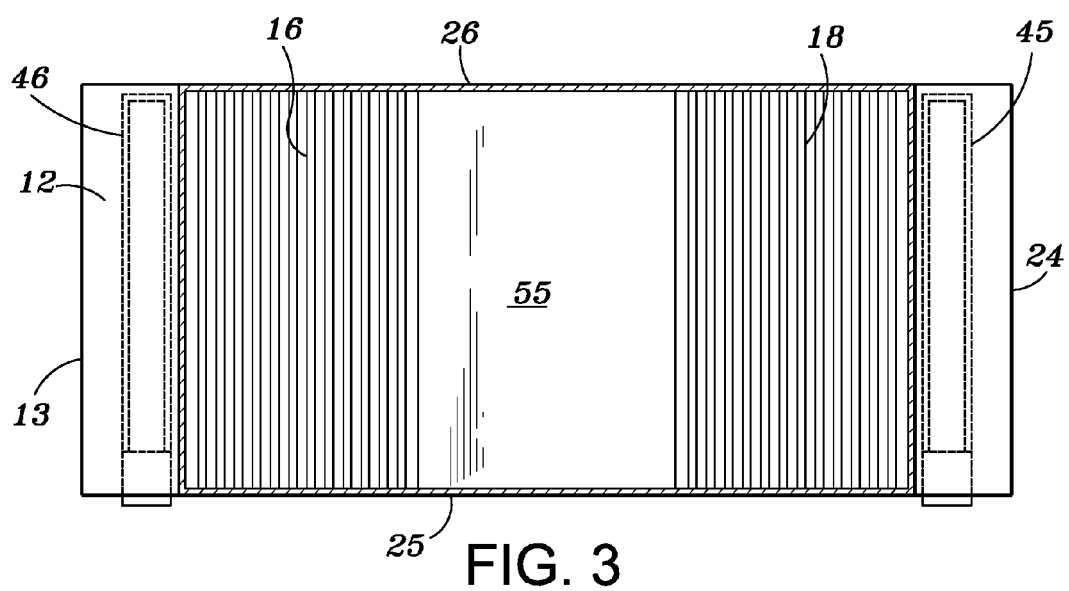
FIG. 3 is a cross-sectional view taken along line 3-3 of FIG. 4.

The grill 10 includes a box like housing which is open in the bottom and includes side walls 13, 24 and front and rear walls 25 and 26 as shown in FIGS. 2 and 3. A pair of drip pans 21 and 22 with handles 28 are slidably mounted within the grill housing as shown in FIG. 2. The grill housing also slidable supports two trays 45 and 46 in any known manner. Trays 45 and 46 may have semi-circular portions 51 within which food flavoring elements 52 are supported.

FIG. 4 discloses the internal structure of the outdoor grill. Drip trays 21 and 22 are located directly below cooking surfaces 16 and 18. Tray 21 is positioned between two baffles 14 that extend the width of the housing. Tray 22 is positioned between two baffles 20 that also extend the width of the housing as shown in FIG. 2. Burner 41 is positioned between one of the baffles 14 and the side wall 13 of the housing such that drippings from cooking surface 16 will not impinge upon the burner 41. Heating gases from burner 41 will be deflected by inclined wall portion 12 of the housing upwardly and inwardly toward cooking surface 16 as shown in FIG. 4. Tray 46 is positioned above burner 41 so that the heated gases will heat the contents of the tray to cause flavoring elements 52 to vaporize. Inwardly extending baffles 15 and 19 are located within the housing to direct any drippings toward the centerline of pans 21 and 22.

Located within the grill housing is an oven 100 formed by two converging bottom wall portions 54 and 53; sidewall portions 58 and 59 and a top wall 56. Shelves 101 and 102 are located within oven 100. A baffle 56 extends along the width of the housing between rear and front housing portions 25 and 26 as shown in FIG. 2. As can be seen in FIG. 4, hot gases from burners 42 and 43 are directed inwardly and upwardly by inclined bottom wall portions 54 and 53. Oven wall portions 54, 53, 58 and 59 are thereby heated by the hot gases arising from burners 42 and 43. Baffle plates 20 function in the same manner as baffle plats 14 to form areas within the grill that are not located directly beneath cooking surface 18 and within which drip pan 22 is slideably located. Thus drippings from cooking surface 18 will not impinge upon burners 43 or 44, thereby avoiding flare-ups. Baffles 19 also serve to direct drippings to the center line of drip pan 22.

Drip pans 21 and 22 may be slideably supported by rails that extend between housing walls 25 and 26 or in any other well-known manner, such as by rails attached to baffles 14 and 20.

Individual burners 41, 42, 43 and 44 are connected to a source of ignitable gas such as propane. Control knobs 27 for individual gas valves that include an ignition device as is well-known in the art are also provided. Burners 41, 42, 43 and 44 may be supported within the housing by any suitable means.

Figure 6:
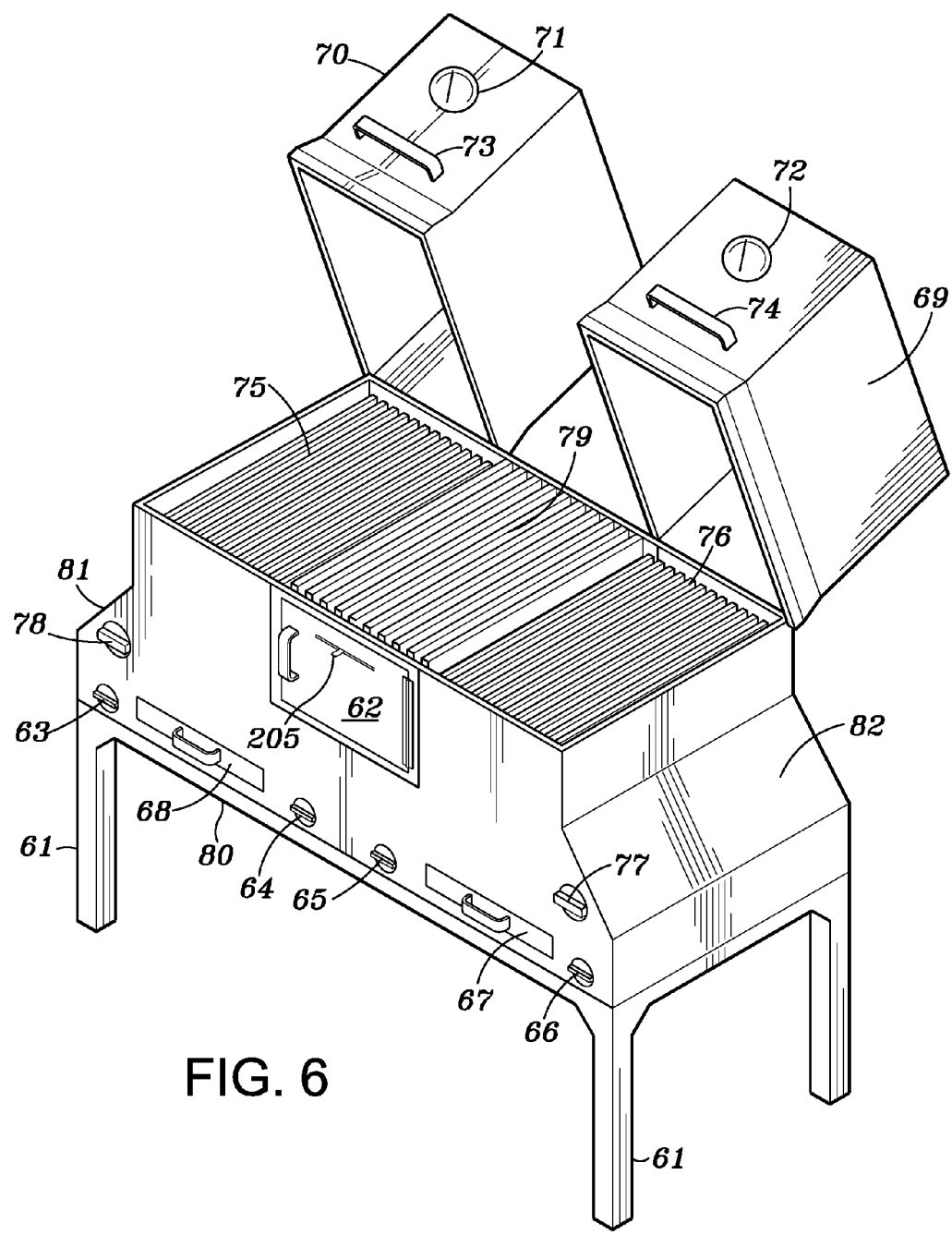
FIG. 6 is a perspective view of an OBG and oven according to a second embodiment of the invention.
Figure 7:
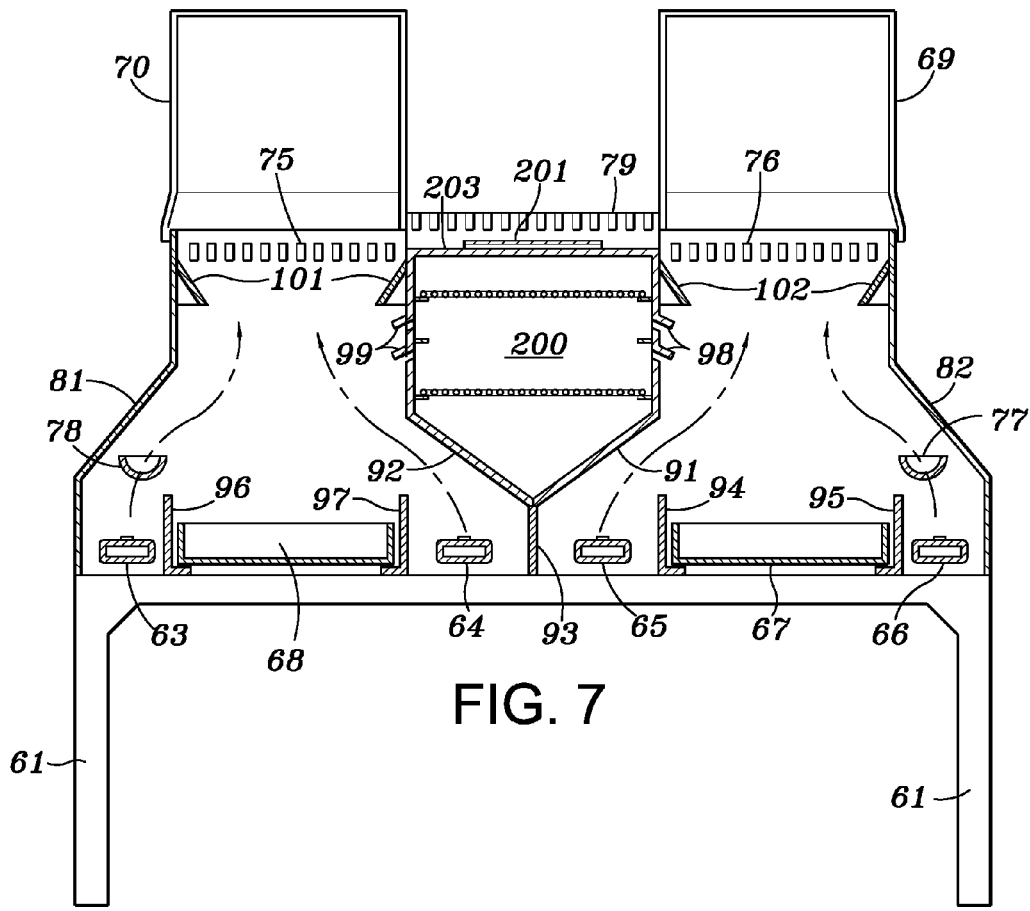
FIG. 7 is a vertical sectional view of the OBG and oven shown in FIG. 6.
Figure 8:
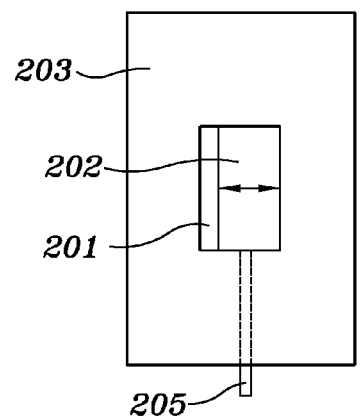
FIG. 8 is a top view of the adjustable vent in the top portion of the oven shown in FIG. 7.

A second embodiment of the invention is illustrated in FIGS. 6 through 8. This embodiment is very similar to that of FIGS. 1-5. The two main differences being the provision of separate cooking chambers and the provision of a third cooking surface above the oven. As shown in FIG. 6, the cooking grill of this embodiment includes a plurality of legs 61 for supporting a frame 80. A pair of drip trays 68 and 67 are slidably mounted within the housing. However, in lieu of a single cover or hood as is the case for the embodiment of FIGS. 1-5, the embodiment of FIG. 6 includes two separate covers 69 and 70 that are pivotably attached to the grill housing in any known manner. Cover 70 is located above cooking surface 75 and cover 69 is located above cooking surface 76 thereby forming two separate cooking chambers. An auxiliary cooking surface 79 which may be of the open grill type is positioned above oven 200 as shown in FIG. 7. An opening 201 is provided in the top surface 203 of oven 200 through which hot gases may escape toward cooking surface 79. A slidable plate 202 is adapted to be moved into and out of opening 201 to vary the amount of hot gases that are directed to cooking surface 79. Hot gases are directed into oven 200 via louvers 98 and 99. Handle 205 is connected to plate 202 and extends outwardly of the grill housing.

As in the first embodiment, baffles 93, 94, 95, 96 and 97 extend between the front and rear walls of the housing to form areas to isolate burners 63, 64, 65 and 66 from drippings that may fall from cooking surfaces 75 and 76. Baffles 101 and 102 also deflect drippings toward the centerline of drip pans 67 and 68. Slanted bottom wall portions 91 and 92 of oven 200 direct heated gases around the oven wall surfaces. Gases are also directed into the interior of oven 200 through louvers 98 and 99. A gas burner may optionally be located within oven 200 as a substitute for or in addition to burners 98 and 99 to provide a heat source within the oven.

Separate covers 69 and 70 include individual temperature gauges 71 and 72 and handles 73 and 74.

Operation of the apparatus is as follows. With respect to the embodiment of FIG. 1, one or more of the burners 41-44 may be turned on. Food to be barbequed may be placed on cooking surfaces 16 or 18 and items to be baked or heated can be placed in oven 100. Heated gases will be deflected by surfaces 12, 54, 53 or 35 toward the cooking surfaces and around the exterior of oven 100. Drippings from the food will fall directly into drip pans 21 and 22 without impinging upon any of the burners. Additionally, baffles 15 and 19 will further direct any drippings toward drip pans 21 and 22. Food flavoring materials such as wood chips can be placed in elongated bowls 51 which can be positioned above burners 41 and/or 44 as shown in FIG. 4.

With respect to the embodiment illustrated in FIGS. 6-8, burners 63-66 can be individually turned on and it is possible to turn on only burners 63 and 64 so that only the left hand portion of the grill including cooking surface 75 and the area under hood 70 will be heated. With all four burners on heated gases will be directed to both cooking surfaces 75 and 76. Also heated gases will be directed into over 200 through louvers 98 and 99. The amount of heated gases directed to cooking surface 79 will depend upon the degree to which vent 201 in the top surface of the oven is open. Typically, vegetables, pots and/or pans can be placed on cooking surface 79.

Although the present invention has been described with respect to specific details, it is not intended that such details should be regarded as limitations on the scope of the invention, except to the extent that they are included in the accompanying claims.

We claim:

1. An Outdoor Barbeque Grill comprising:
a housing having an open top;
a first cooking surface covering a portion of the open top;
a first burner adapted to be connected to a source of fuel; and
an oven located within and apart from the housing, said oven including a top surface, a bottom surface, sidewalls and a front opening,
a second burner vertically offset from said cooking surface and wherein a removable first drip pan is positioned between the first and second burners,
a third and fourth burner, said oven positioned within said housing directly above said second and third burners,
a second cooking surface located above the third and fourth burners, the third and fourth burners being vertically offset with respect to the second cooking surface, and wherein the first and second cooking surfaces are located on opposite sides of the oven, wherein the
bottom surface of the oven includes two inclined bottom portions, a first inclined bottom portion positioned directly above the second burner and a second inclined portion positioned above the third burner.

2. An Outdoor Barbeque Grill as claimed in claim 1 wherein said housing has a sloping surface and the burner is positioned underneath said sloping surface whereby air heated by said burner is directed inwardly of said housing toward said cooking surface.

3. An Outdoor Barbeque Grill according to claim 2 further including a container for food flavoring material positioned directly above the burner.

4. An Outdoor Barbeque Grill according to claim 1 further including a baffle extending from the housing to a position below the cooking surface to deflect drippings from food on the cooking surface inwardly.

5. An Outdoor Barbeque Grill according to claim 1 wherein said oven includes a pivoted door with a handle covering the front opening.

6. An Outdoor Barbeque Grill according to claim 1 wherein the first, second, third and fourth burners are aperture pipes.

7. An Outdoor Barbeque Grill according to claim 1 further comprising a second removable drip pan positioned between the third and fourth burners.

8. An Outdoor Barbeque Grill according to claim 1 further including a plurality of legs for supporting the grill on a horizontal surface.

9. An Outdoor Barbeque Grill according to claim 1 further including a cover pivotably connected to an upper portion of the housing.

10. An Outdoor Barbeque Grill as claimed in claim 1 further including, a two covers, each cover being separately pivotably attached to the housing above a respective cooking surface, thereby isolating the space above the cooking surface from the atmosphere when the cover is in a closed position.

11. An Outdoor Barbeque Grill as claimed in claim 10 further including a louver in a side wall of the oven for admitting hot gases into the oven and a vent in the top surface of the oven and a third cooking surface located above the vent.

12. An Outdoor Barbeque Grill as claimed in claim 11 further including means for adjusting an outlet area of the vent.

13. An outdoor Barbeque Grill comprising;
- a housing having an open top;
- a first cooking surface covering a portion of the open top;
- a plurality of horizontally spaced burners adapted to be connected to a source of fuel;
- an oven located within the housing;
- said oven including a bottom floor having converging wall portions;
- at least one burner being positioned directly below a converging wall portion of the oven, and a baffle positioned between the burners located directed below the converging wall portions wherein the baffle extends to an apex formed by the converging wall portions.

\* \* \* \* \*